(12) United States Patent
Liao et al.

(10) Patent No.: US 9,639,285 B2
(45) Date of Patent: May 2, 2017

(54) DISTRIBUTED RAID IN A FLASH BASED MEMORY SYSTEM

(71) Applicant: Aupera Technologies, Inc., Burnaby (CA)

(72) Inventors: Yu Feng Liao, Surrey (CA); Zuoying Wu, Vancouver (CA); Zhengning Zhou, Shenzhen (CN)

(73) Assignee: Aupera Technologies, Inc., Burnaby, BC (CA)

( * ) Notice: Subject to any disclaimer, the term of this patent is extended or adjusted under 35 U.S.C. 154(b) by 19 days.

(21) Appl. No.: 14/339,970

(22) Filed: Jul. 24, 2014

(65) Prior Publication Data

US 2015/0261460 A1 Sep. 17, 2015

Related U.S. Application Data

(60) Provisional application No. 61/952,247, filed on Mar. 13, 2014.

(51) Int. Cl.
*G06F 12/00* (2006.01)
*G06F 3/06* (2006.01)
*G06F 12/02* (2006.01)

(52) U.S. Cl.
CPC .......... *G06F 3/0619* (2013.01); *G06F 3/0655* (2013.01); *G06F 3/0688* (2013.01); *G06F 3/0689* (2013.01); *G06F 12/0246* (2013.01); *G06F 2212/7208* (2013.01)

(58) Field of Classification Search
CPC .... G06F 3/0619; G06F 3/0688; G06F 3/0689; G06F 3/0655; G06F 2212/7208; G06F 12/0246
See application file for complete search history.

(56) References Cited

U.S. PATENT DOCUMENTS

| | | | |
|---|---|---|---|
| 8,386,887 B2 | 2/2013 | Frost | |
| 2002/0124134 A1* | 9/2002 | Chilton | H04L 67/1095 711/113 |
| 2003/0163509 A1* | 8/2003 | McKean | G06F 9/5027 718/100 |
| 2009/0094406 A1* | 4/2009 | Ashwood | G06F 13/404 711/103 |
| 2011/0296277 A1* | 12/2011 | Flynn | G06F 1/183 714/773 |
| 2013/0019062 A1 | 1/2013 | Bennett | |

* cited by examiner

*Primary Examiner* — Kalpit Parikh
(74) *Attorney, Agent, or Firm* — Timothy T. Wang; Ni, Wang & Massand, PLLC

(57) ABSTRACT

A Flash-based memory system comprises of a plurality of memory nodes, each memory node comprises a distributed RAID controller agent, a memory controller, and a plurality of memory devices. All the memory nodes are connected in a ring type topology by one or more high-speed serial communication links. More particularly, in each memory node, the RAID controller agent is closely coupled with the memory controller.

7 Claims, 5 Drawing Sheets

| Source Node | Destination Node | Path |
| --- | --- | --- |
| Node 122 | Node 121 | 132 |
| Node 122 | Node 123 | 133 |
| Node 122 | Node 125 | 139 |
| Node 122 | Node 126 | 132, 131 / 139, 136 * |
| Node 122 | Node 124 | 133, 134 / 139, 135 * |

(*Round-robin arbitration is used to determine the data transfer for two paths.)

FIG. 3

| Node | Address range |
| --- | --- |
| 121 | 0x0100,0000 – 0x01FF,FFFF |
| 122 | 0x0200,0000 – 0x02FF,FFFF |
| 123 | 0x0300,0000 – 0x03FF,FFFF |
| 124 | 0x0400,0000 – 0x04FF,FFFF |
| 125 | 0x0500,0000 – 0x05FF,FFFF |
| 126 | 0x0600,0000 – 0x06FF,FFFF |

FIG. 4

| Byte | Bits | Mnemonic | Description |
|---|---|---|---|
| 0 | 7:0 | DstNID | Destination memory node identifier |
| 1 | 7:0 | SrcNID | Source memory node identifier |
| 2 | 7:0 | PathNo | Path number |
| 3 | 1:0 | PktType | Packet type, 0x00-request, 0x01-data |
|  | 7:2 | Rsv | Reserved |
| 7:4 | N/A | PktLn | Packet length |
| 17607:8 | N/A | PayLoad | Pay load, 1 flash page, 17600 bytes |
| 17611:17608 | N/A | CRC | CRC check |

DISTRIBUTED RAID IN A FLASH BASED MEMORY SYSTEM

BACKGROUND

The system disclosed herein relates to a Flash based memory system and more particularly relates to a Flash based memory system with distributed redundant array of independent disks ("RAID").

RAID controller and memory controller are two important components in a contemporary memory storage system. RAID controller usually provides tasks such as intelligent data management, parity data generation, and cache backup. Memory controller usually provides Flash device management, physical address to logic address conversion, wear leveling, block picking, and garbage collection. Often RAID controller and memory controller are two independent entities, and such system architectures are limited in their bandwidth because they have a limited connection between each other; also, performance of such a system is limited by the computing power in centralized RAID controllers, and bottlenecks can arise through the use of complicated switching or interconnection methodologies.

To overcome the aforementioned shortcomings of the current systems in the market, the disclosed system provides an optimal Flash based memory system, with distributed RAID controller agent, closely coupled with memory controller, such architecture can provide more effective data flow inter-connection and parity check computing load sharing.

SUMMARY

A Flash based memory system disclosed herein comprises a plurality of memory nodes. Each memory node comprises a RAID controller agent, a memory controller, and a plurality of memory devices. Each RAID controller agent is closely coupled with the memory controller. Each memory node is connected to the other memory nodes in a ring-type topology via one or more high-speed serial communication links. The memory controller is connected to a plurality of memory devices by one or more parallel or serial communication links.

Each memory node is connected to an I/O interface module by a high-speed serial communication link, and each I/O interface module is configured to communicate with external host devices over one or more communication links.

During the system initialization, a provisioning stage will be performed, a unique node identity number (NID) is assigned to each memory node.

Methods of operating this system is also disclosed. The methods include the steps of assigning NIDs, setting up the data routing path table and data packet format.

BRIEF DESCRIPTION OF THE DRAWINGS

FIG. 3 shows an exemplary data routing table for one of the memory nodes as depicted in FIG. 2 (node 122).

FIG. 4 shows an exemplary address range for each memory node in the system depicted in FIG. 2.

DETAILED DESCRIPTION

Figure 1:
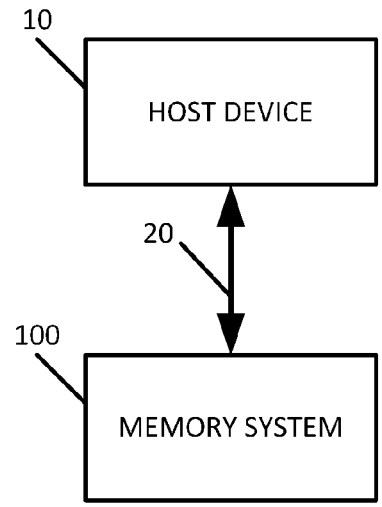
FIG. 1 shows a block diagram of an exemplary computing system comprising a host device and a memory system.

While the inventions disclosed herein are susceptible to various modifications and alternative forms, specific embodiments are shown by way of examples in the drawings and described in detail. It should be understood that the figures and detailed description discussed herein are not intended to limit the invention to the particular forms disclosed. On the contrary, the intention is to cover all modifications, equivalents and alternatives falling within the spirit and scope of the present inventions as defined by the appended claims.

An exemplary computing storage system, shown in FIG. 1, may comprise of a host device 10, and a memory system 100. The most common operations to be performed include reading data from an address in the memory system 100 for return to the host device 10, or writing data provided by the host device 10 to an address in the memory system 100. The data to be read or written may be comprised of a single address, or a block of addresses and a block size.

In FIG. 1, the interface between the host device 10, which represents the global environment external to the memory system 100, and the memory system 100, may be any of the interface types, including but not limited to, PCIe bus, Serial Rapid I/O, XAUI interface, Fiber Channel, Infiniband, Gigabit Ethernet, which have one or more bidirectional channels.

Figure 2:
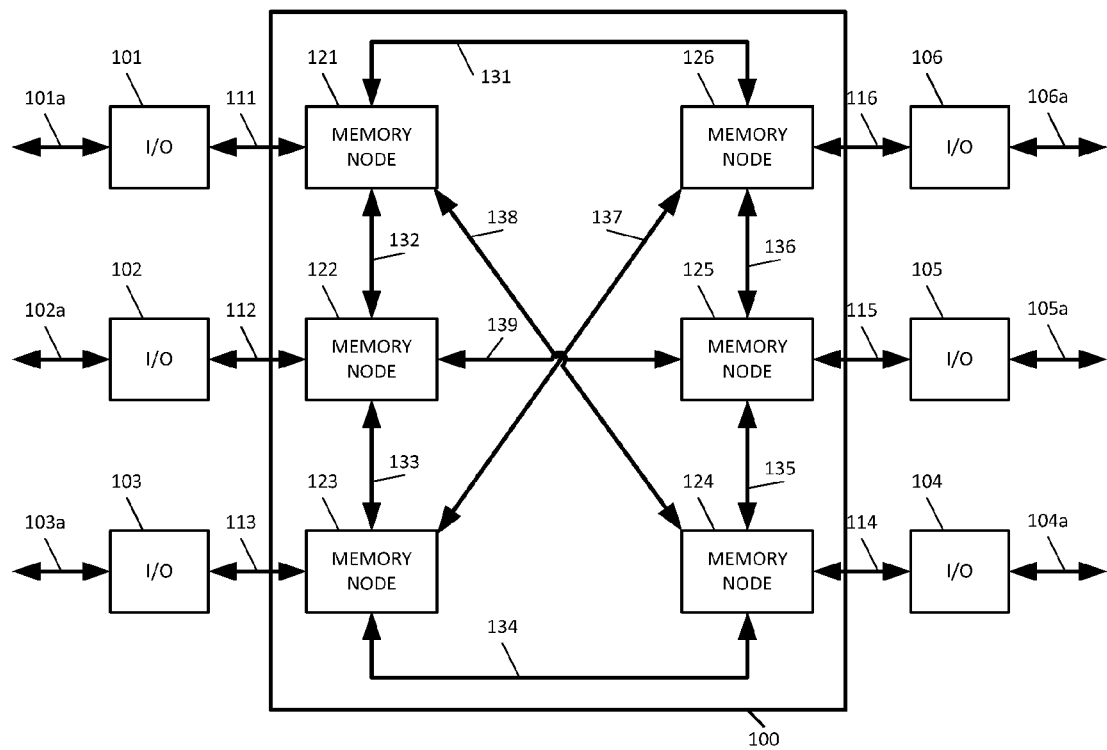
FIG. 2 shows a block diagram of a preferred exemplary memory system having a plurality of memory nodes, and the interconnection between each other.
Figure 7:
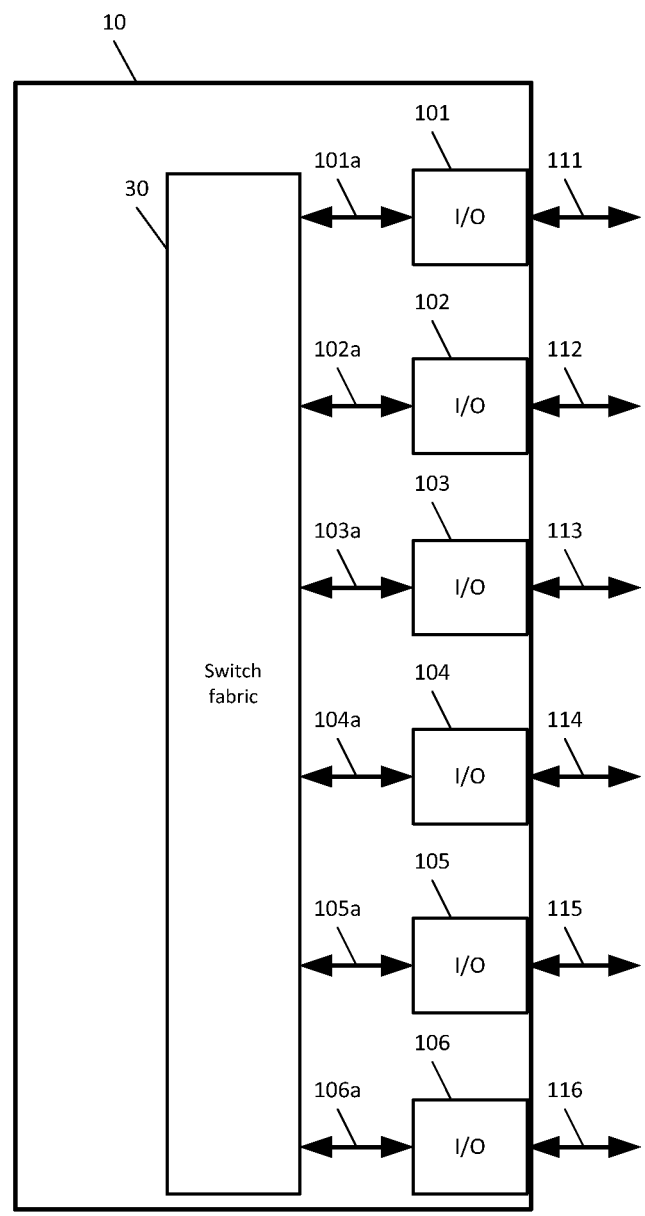
FIG. 7 shows a block diagram of an exemplary host device.

In FIG. 2, the memory system 100 communicates with a plurality of input/output interface modules. In this example, six I/O modules (i.e., 101, 102, 103, 104, 105, and 106) are illustrated, although the number of I/O modules is not critical and subject to change. Each I/O module may be coupled to one or more external host devices via a host communication channel (101a, 102a, 103a, 104a, 105a, and 106a, respectively), or I/O modules may be part of a host device as shown in FIG. 7. The channels 101a, 102a, 103a, 104a, 105a, and 106a allow external host devices such as servers or any other devices that can operate as a host—to provide and/or receive commands, instructions, and data to/from the I/O interface modules 101, 102, 103, 104, 105 and 106.

In FIG. 2, the system 100 includes and utilizes a plurality of memory nodes. In this example, six memory nodes (i.e., 121, 122, 123, 124, 125, and 126) are illustrated, although the number of memory nodes is not critical and subject to change. Each memory node comprises a RAID controller agent, a memory controller, and a plurality of flash memory devices. Each memory node is connected to one I/O modules via a communication channel (111, 112, 113, 114, 115, and 116, respectively). The channels 111, 112, 113, 114, 115 and 116 may be any type of the high speed serial communication interfaces.

In FIG. 2, a plurality of communication links is provided so that all memory nodes may communicate with each other. The serial links may be high speed SERDES (Serializer/Deserializer), or LVDS (Low Voltage Differential Signaling), or the like, as currently known or to be later developed.

In FIG. 2, the communication between memory nodes may be made in the form of a ring-type topology with each memory node connected with other memory nodes. For example, node 121 directly connects with node 124 through high speed communication link 138; therefore, the transmission time between node 121 and node 124 is reduced.

In a preferred embodiment as shown in FIG. 2, data from each I/O module will be transferred to a respective memory node; then the data may be distributed to the flash memory devices associated with the memory node, or to other memory nodes for parity check or other data processing actions. Each node has its own data routing path table. An exemplary routing path table for node 112 is shown in FIG. 3. A routing path table typically includes at least data columns for source node, destination node, and the path(s) from the source to the destination node. There could be one or more paths from a source node to a destination node. For example, there are two paths (channels 132 and 131 or channels 139 and 136) from Node 122 to Node 126 in the example shown in FIG. 3. Round-robin arbitration or other methods could be employed to determine the path for a data transfer.

In another preferred embodiment that implements RAID5, each set of data are transferred to nodes 121, 122, 123, 124, 125, and stored in the associated memory devices. The data will also be routed to node 126 through each respective channel, 131, 132+131, 137, 135+136, 136 to compute the parity data, and to store in the memory devices associated with node 126. Each memory node is equipped with a RAID controller agent, and can be assigned for low-level data processing such as parity check, data compression/decompression, and/or encryption/decryption; therefore the computing load is distributed to each memory node in the system.

In another preferred embodiment, each memory node has an address table, which stores the address range for the Flash memory devices associated with each node, for example, exemplary address ranges for the memory nodes depicted in FIG. 2 is shown in FIG. 4.

Figure 8:
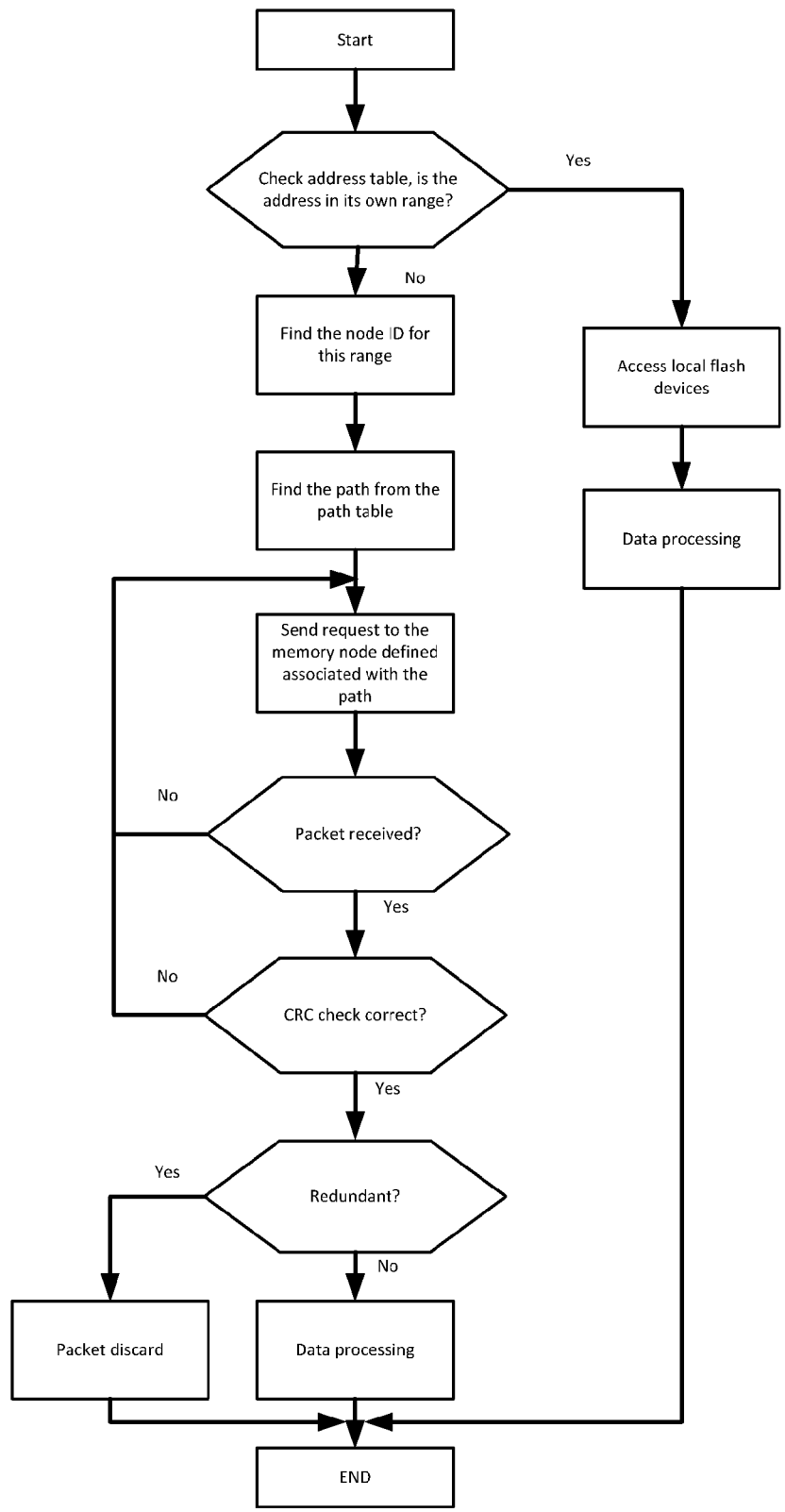
FIG. 8 shows an exemplary flow chart of packet processing.

In a preferred embodiment, each memory node has its own data flow controller to process received instructions. As shown in FIG. 8, the process starts with checking the address against the table for the present memory node. If the requested address is in its own range, then the system will access the address in the local flash devices and start the data processing. If the requested address is outside the range of the current memory node, the data flow controller will find the ID for the memory node that includes the requested address. It then find the path from the data routing path table and send a data request to the target memory node along the path. After receiving the data packets from the target memory node, the current memory node performs a CRC ("cyclic redundancy check") check to verify the received data packet. If the data is determined to be redundant, the received data packets are discarded; if not, the data is processed based on the received instructions.

Figures 5, 6:
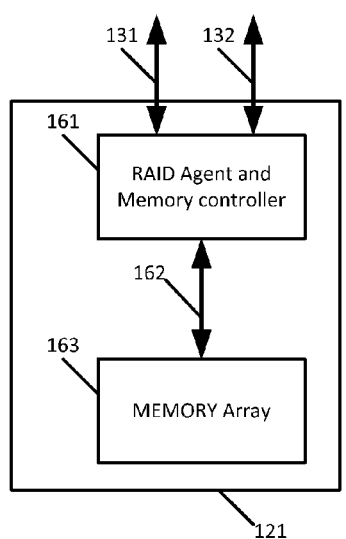
FIG. 5 shows an exemplary data packet format in a preferred exemplary memory system.
FIG. 6 shows a block diagram of an exemplary memory node (node 121).

The data between different memory nodes, for example, can be formatted as the example shown in FIG. 5.

In another preferred embodiment, each I/O module may be a separate interface module or could be part of the host device, as shown in the example depicted in FIG. 7.

FIG. 6 depicts a preferred embodiment where the memory node 121 comprises a RAID controller agent and memory controller, 161, and a plurality of Flash memory devices (memory array) 163. The RAID controller and memory controller 161 communicate with the plurality of Flash memory devices 163 through the communication link 162, which could be a high speed serial communication link or parallel bus.

Further in FIG. 6, the memory node 121 communicates with other memory nodes through high speed serial communication links 131 and 132.

In a preferred embodiment, the distributed RAID controller agent and memory controller 161 can be formed through the use of a field programmable gate array, or "FPGA", such as a Cyclone FPGA available from Altera. It's understood that unit 161 could alternatively be implemented using other types of FPGA devices, a programmed microprocessor, a specific ASIC, or a combination of any and all of the above.

In a preferred embodiment as shown in FIG. 6, the memory array 163 may include a plurality of memory devices, which includes but are not limited to MLC NAND Flash, SLC NAND Flash, SRAM, DDR SDRAM, and MRAM. The systems disclosed herein use Flash memory as the storage devices, but other memory devices such as SRAM, DDR SDRAM and MRAM could also be incorporated as part of a hybrid system. For example, the other types of memory devices could serve as cache or other part of the memory storage system.

In another preferred embodiment as shown in FIG. 7, I/O modules 101, 102, 103, 104, 105, and 106 can be part of host device 10, and connect to internal module 30, including, but not limited to switch fabric, cross bar, data bus, or data buffer.

In another preferred embodiment, host device 10 could be a network processor. Examples of a suitable network processor include Tilera Gx72 or Gx36, Cavium Octeon, and Freescale QorIQ. Other suitable network processors will be apparent to those skilled in the art. Alternatively, a special purpose ASIC or FPGA may be used to support the functions as a host controller.

Depending what type of RAIDs this system will implement, a provisioning stage may be performed during system initialization. During the process, a unique NID is assigned to each memory node in the ring type topology. An initial data routing path table and data packet format are also set up during the provisioning stage. Other initialization tasks may also be performed in order to get the system ready for operation.

Although the invention has been described in terms of specific embodiments, it is anticipated that alterations and modifications thereof will no doubt become apparent to those skilled in the art. It is therefore intended that the following claims be interpreted as covering all such alterations and modifications as they fall within the true spirit and scope of the invention.

What is claimed is:

1. A Flash based memory system, comprising:
   a plurality of memory nodes, each communicates with the other memory nodes in a ring type topology, wherein a unique node identity number (NID) is assigned to each memory node in the ring type topology and wherein each said memory node is further comprised of:
   a memory controller;
   a plurality of data flow controllers, wherein each memory module has an individual data flow controller to process received instructions;
   a distributed RAID controller agent running on said memory controller and said plurality of data flow controllers; and
   a plurality of Flash memory devices;
   wherein each of said memory nodes is connected to an external host device through one or more I/O modules by a high-speed communication link;

wherein each distributed RAID agent and memory controller in a memory node are connected to an array of memory devices through a parallel bus or high speed serial communication link;

wherein each said distributed RAID controller agent at each said memory node is assigned for at least one of the following RAID data processing tasks including parity calculation/check, compression/decompression, and encryption/decryption; and wherein each said distributed RAID controller agent cooperates with other RAID controller agent at other memory node to dynamically redistribute one or more of the said RAID data processing tasks.

2. The Flash based memory system of claim 1, wherein said distributed RAID controller agent and memory controller are closely coupled in the form of a FPGA, an ASIC, or a programmed microprocessor.

3. The Flash based memory system of claim 1, wherein each of said memory node communicates other memory nodes in the ring through one more data routing paths.

4. The flash based memory system of claim 1, wherein data from each said I/O module can be distributed to any of said memory nodes without interaction with a host device.

5. The Flash based memory system of claim 1 further comprising other types of memory devices such as SRAM, DDR SDRAM, or MRAM.

6. The Flash based memory system of claim 1, wherein said I/O modules are part of said external host device.

7. The Flash based memory system of claim 1, wherein said I/O modules are separate modules coupled to said external host device via one or more communication channels.

* * * * *